(12) United States Patent
Filsfils et al.

(10) Patent No.: US 10,892,987 B2
(45) Date of Patent: *Jan. 12, 2021

(54) SEGMENT ROUTING NETWORK PROCESSING OF PACKETS INCLUDING PACKETS HAVING A SEGMENT IDENTIFIER STRUCTURE PROVIDING PROCESSING AND/OR MEMORY EFFICIENCIES

(71) Applicant: Cisco Technology, Inc., San Jose, CA (US)

(72) Inventors: Clarence Filsfils, Brussels (BE); Ahmed Refaat Bashandy, Milpitas, CA (US); Syed Kamran Raza, Kanata (CA); Darren Dukes, Ottawa (CA); Patrice Brissette, Gatineau (CA); Jisu Bhattacharya, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/929,601

(22) Filed: May 12, 2020

(65) Prior Publication Data
US 2020/0274798 A1    Aug. 27, 2020

Related U.S. Application Data

(63) Continuation of application No. 15/866,176, filed on Jan. 9, 2018, now Pat. No. 10,652,144.

(51) Int. Cl.
*H04L 12/721* (2013.01)
*H04L 12/755* (2013.01)
(Continued)

(52) U.S. Cl.
CPC .......... *H04L 45/566* (2013.01); *H04L 45/021* (2013.01); *H04L 45/34* (2013.01); *H04L 45/741* (2013.01); *H04L 45/745* (2013.01)

(58) Field of Classification Search
CPC ... H04L 45/566; H04L 45/021; H04L 45/745; H04L 12/721; H04L 45/34; H04L 45/741;
(Continued)

(56) References Cited

U.S. PATENT DOCUMENTS 9,537,769 B2   1/2017 Bryant et al.
9,762,488 B2   9/2017 Previdi et al.
(Continued)

OTHER PUBLICATIONS

Filsfils et al,. (Network Working Group "Segment Routing Architecture", Dec. 20, 2017, as indicated by IDS filed on Mar. 19, 2019, herein after Filsfils), 2017.*
(Continued)

*Primary Examiner* — Hardikkumar D Patel
(74) *Attorney, Agent, or Firm* — The Law Office of Kirk D. Williams (57) ABSTRACT

In one embodiment, segment routing (SR) network processing of packets is performed on packets having a segment identifier structure providing processing and/or memory efficiencies. Responsive to an identified particular segment routing policy, the particular router retrieves from memory a dynamic segment routing identifier portion of the particular SR policy that includes a SR node value and a SR function value. The SR function value identifies segment routing processing to be performed by a router in the network identified based on the SR node value. A segment routing discriminator is independently identified, possibly being a fixed value for all segment identifiers in the network. Before sending into the network, a complete segment identifier is added to the particular packet by combining the segment routing discriminator with the dynamic segment
(Continued)

routing identifier portion. The particular packet including the complete segment identifier is sent into the network.

20 Claims, 6 Drawing Sheets

(51) Int. Cl.
*H04L 12/741* (2013.01)
*H04L 12/749* (2013.01)

(58) Field of Classification Search
CPC . H04L 29/06; H04L 63/1433; H04L 63/1425; H04L 63/1408; H04L 63/0227; H04L 63/0236; H04L 61/2007; H04L 12/815; H04L 65/4069; H04L 65/602; H04L 47/621; H04L 47/564; H04L 12/801; H04L 47/27; H04L 12/26; H04L 41/0816; H04L 43/08; H04L 47/22; H04L 43/0882; H04L 29/12905; H04L 61/157; H04L 61/3075; H04L 61/605; H04L 61/6054; H04W 28/0226; G06F 15/16
See application file for complete search history.

(56) References Cited

U.S. PATENT DOCUMENTS

| | | | |
|---|---|---|---|
| 10,063,475 | B2 | 8/2018 | Previdi et al. |
| 10,382,334 | B2 | 8/2019 | Previdi et al. |
| 10,652,144 | B2 | 5/2020 | Filsfils et al. |
| 2014/0369356 | A1 | 12/2014 | Bryant et al. |
| 2015/0256456 | A1 | 9/2015 | Previdi et al. |
| 2019/0104058 | A1* | 4/2019 | Filsfils .................. H04L 45/34 |
| 2019/0215267 | A1 | 7/2019 | Filsfils et al. |

OTHER PUBLICATIONS

Filsfils (SRv6 Network Programming, Mar. 9, 2017, IDS filed on Feb. 21, 2018, herein after FilsfilsSRv6), 2017.*
PCT International Search Report and Written Opinion, PCT Application PCT/US2019/012121, ISA/EP, European Patent Office, Netherlands, dated Feb. 28, 2019 (sixteen pages).
Filsfls et al., "Segment Routing Architecture," draft-ietf-spring-segment-routing-14, Dec. 20, 2017, The Internet Society, Reston, VA, USA (thirty-one pages).
Filsfls et al., "SRv6 Network Programming," draft-filsfils-spring-srv6-network-programming-00, Mar. 9, 2017, The Internet Society, Reston, VA, USA (forty-one pages).
Filsfls et al., "SRv6 Network Programming," draft-filsfils-spring-srv6-network-programming-01, Jun. 28, 2017, The Internet Society, Reston, VA, USA (forty-two pages).
Filsfls et al., "Segment Routing Architecture," draft-ietf-spring-segment-routing-11, Feb. 16, 2017, The Internet Society, Reston, VA, USA (twenty-eight pages).
Filsfls et al., "Segment Routing Architecture," draft-ietf-spring-segment-routing-12, Jun. 20, 2017, The Internet Society, Reston, VA, USA (twenty-eight pages).
Prevdid et al., "IPv6 Segment Routing Header (SRH)," draft-ietf-6man-segment-routing-header-06, Mar. 13, 2017, The Internet Society, Reston, VA, USA (thirty-five pages).
Rekhter et al., "A Border Gateway Protocol 4 (BGP-4)," RFC 4271, Jan. 2006, The Internet Society, Reston, VA, USA (104 pages).
Bates et al., "Multiprotocol Extensions for BGP-4," RFC 2283, Feb. 1998, The Internet Society, Reston, VA, USA (nine pages).
Deering et al., "Internet Protocol, Version 6 (IPv6) Specification," RFC 2460, Dec. 1998, The Internet Society, Reston, VA, USA (thirty-nine pages).
Rosen et al., "Multiprotocol Label Switching Architecture," RFC 3031, Jan. 2001, The Internet Society, Reston, VA, USA (sixty-one pages).
"Information technology—Telecommunications and information exchange between systems—Intermediate System to Intermediate System intra-domain routeing information exchange protocol for use in conjunction with the protocol for providing the connectionless-mode network service (ISO 8473)," Second Edition, Nov. 15, 2002, ISO/IEC 2002, Switzerland (210 pages).
T. Bates et al., "Multiprotocol Extensions for BGP-4," RFC 4760, Jan. 2007, The Internet Society, Reston, VA, USA (twelve pages).
S. Deering and R. Hinden, "Internet Protocol, Version 6 (IPv6) Specification," RFC 8200, Jul. 2017, The Internet Society, Reston, VA, USA (forty-two pages).
Filsfls et al., "SRv6 Network Programming," draft-filsfils-spring-srv6-network-programming-03, Dec. 21, 2017, The Internet Society, Reston, VA, USA (fifty-three pages).

* cited by examiner

SEGMENT ROUTING NETWORK PROCESSING OF PACKETS INCLUDING PACKETS HAVING A SEGMENT IDENTIFIER STRUCTURE PROVIDING PROCESSING AND/OR MEMORY EFFICIENCIES

CROSS-REFERENCE TO RELATED APPLICATIONS

This application is a continuation of U.S. patent application Ser. No. 15/866,176, filed Jan. 9, 2018, which is hereby incorporated by reference in its entirety.

TECHNICAL FIELD

The present disclosure relates generally to sending of packets through a packet network, such as, but not limited to, according to segment routing of packets through a packet network.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Packets are typically forwarded in a network forwarded based one or more values representing network nodes or paths.

BRIEF DESCRIPTION OF THE DRAWINGS

The appended claims set forth the features of one or more embodiments with particularity. The embodiment(s), together with its advantages, may be understood from the following detailed description taken in conjunction with the accompanying drawings of which:

DESCRIPTION OF EXAMPLE EMBODIMENTS

1. Overview

Disclosed are, inter alia, methods, apparatus, computer-storage media, mechanisms, and means associated with segment routing (SR) network processing of packets including packets having a segment identifier structure providing processing and/or memory efficiencies.

One embodiment includes receiving a particular packet by a particular router in a network. Responsive to the particular router data plane ascertaining a particular segment routing (SR) policy based on the particular packet said received, the particular router retrieves from memory a dynamic segment routing identifier portion of the particular SR policy, with the dynamic segment routing identifier portion including a SR node value and a SR function value. The SR function value identifies segment routing processing to be performed by a router in the network identified based on the SR node value. A segment routing discriminator is identified independently from said retrieving the dynamic segment routing identifier portion including that the segment routing discriminator and the dynamic segment routing identifier are not being stored continuously in said memory. A complete segment identifier is added to the particular packet, which includes combining the segment routing discriminator with the dynamic segment routing identifier portion said retrieved from said memory, with the segment routing discriminator identifying that the particular packet is a segment routing packet. The particular packet including the complete segment identifier is sent into the network.

In one embodiment, the complete segment identifier is a 128-bit Internet Protocol version 6 (IPv6) address. In one embodiment, the highest-order bits of the complete segment identifier consist of three predetermined fixed-width fields storing the segment routing discriminator followed by the SR node value followed by the SR function value. In one embodiment, the dynamic segment routing identifier portion said retrieved from said memory includes an argument value qualifying processing according to the SR function value, with the highest-order bit of the argument value being included at a predetermined fixed-bit position immediately following the SR function value in the highest-order bits of the complete segment identifier.

One embodiment includes advertising, via a routing protocol in the network, a route corresponding to the complete segment identifier such that packets in the network matching the route are forwarded through the network to the router; updating with the route and forwarding information a routing information base (RIB) and a data plane forwarding information base (FIB) in the particular router and in another router in network; receiving, by the router, the particular packet with the complete segment identifier said added; and particular segment routing processing, by the router, of the particular packet based on the SR function value in the complete segment identifier; wherein the particular packet is said sent from the particular router based on said forwarding information corresponding to the route in the FIB in the particular router.

One embodiment includes receiving a particular packet by a particular router in a network. Responsive to the particular router data plane ascertaining based on the particular packet a particular segment routing (SR) policy associated with a plurality of dynamic segment routing identifier portions, the particular router adding a plurality of complete segment identifiers to the particular packet, with each of the plurality of complete segment identifiers being an Internet Protocol (IP) routable address of a SR-capable router in the network. The particular packet with the plurality of complete segment identifiers is sent from the particular router into the network. In one embodiment, each of the plurality of dynamic segment routing identifier portions includes a SR node value and a SR function value, with the SR function value identifying corresponding segment routing processing to be performed on the particular packet by a corresponding router in the network identified based on the SR node value. In one embodiment, said adding the plurality of complete segment identifiers to the particular packet includes creating each particular complete identifier of the plurality of complete segment identifiers which includes combining a segment routing discriminator and a corresponding different one of the plurality of dynamic segment routing identifier portions retrieved from memory. In one embodiment, the segment routing discriminator is the same in each of the plurality of complete segment identifiers. In one embodiment, each of the plurality of complete segment identifiers is an IP version 6 (IPv6) address; and wherein the particular packet said sent from the particular router is an IPv6 packet including a Segment Routing version 6 (SRv6) Header (SRH) that includes one or more of the plurality of complete segment identifiers. In one embodiment, the highest-order bits of the each of the plurality of complete segment identifiers includes three predetermined fixed-width fields storing the segment routing discriminator followed by the SR node value followed by the SR function value. One embodiment includes a router receiving the particular packet with the plurality of complete segment identifiers said added, with the router particular segment routing processing of the particular packet based on a particular SR function value in a current complete segment identifier of the plurality of complete segment identifiers said added. In one embodiment, said particular segment routing processing is responsive to an argument value retrieved from the current complete segment identifier at a predetermined fixed-bit argument position.

2. Description

Disclosed are, inter alia, methods, apparatus, computer-storage media, mechanisms, and means associated with segment routing (SR) network processing of packets including packets having a segment identifier structure providing processing and/or memory efficiencies. As used herein segment routing (SR) includes, but is not limited to using Internet Protocol Version 4 or 6 (IPv4 or IPv6) addresses as segment routing identifiers (SIDs). Further, SR includes, but is not limited IPv6 SR (SRv6) and/or IPv4 (SRv4).

The term "complete segment identifier" is used herein to refer to a segment identifier that includes a SR discriminator and a dynamic portion including a SR node value and a SR function value. The complete segment identifier is a routable address in the network, such as, but not limited to an IPv4 or IPv6 address. The dynamic portion refers to the portion of the complete segment identifier stored, for example, on a per route basis.

The SR discriminator is a fixed value of one or a small number of possible fixed values. In one embodiment, the SR discriminator is the same for all complete segment identifiers and therefore requires no bits in the dynamic portion to identify which SR discriminator to use for a particular packet. One embodiment uses two, four or eight different possible SR discriminators, with the dynamic portion expanded by one, two, or three bits that identifies the value of the specific one of the small number of SR discriminators to use when adding a complete segment identifier to a packet.

The complete segment identifier has a structure (a particular way of organizing information) that greatly improves processing and/or memory efficiencies by reducing the memory storage requirements and providing for efficient comparison (e.g., exact match) and table lookup operations on portions of the complete segment identifier (e.g., instead of one or more longest prefix matching operations which require more resources).

The dynamic portion of the complete segment identifier is typically stored on a per route basis. Using an SR discriminator reduces the size of each of these dynamic portions (e.g., by the number of bits in the SR discriminator). In one embodiment, a complete segment identifier is a 128-bit IPv6 address, with the discriminator being sixty-four bits, the SR node value being sixteen bits, the SR function value being sixteen bits, and the argument value being zero or some small number of bits. Thus, instead of storing the entire 128 bits for each route, one embodiment uses the structure of the complete segment identifier to store on a per route basis only a thirty-two bit dynamic portion (plus any argument bits).

In one embodiment when adding each of one or more complete segment identifiers to a packet, the SR network node adds the SR discriminator from a register or global memory and the corresponding dynamic portion retrieved from memory (and bit-padded as needed).

In one embodiment instead of performing a longest prefix matching operation which requires more resources, a network node receiving a packet compares (e.g., exact match) the high-order bits of the IP destination address to a possible route discriminator to determine if it is a SR packet, and if so, then compares (e.g., exact match) the SR node value to determine if the SR packet is for the network node. In one embodiment, these two operations are performed as a single operation. In one embodiment, the SR node value is unique to one or more SR nodes in the network that is to process a packet according to a complete segment identifier including the SR node value.

As described herein, embodiments include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc., may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope of the embodiments. The term "apparatus" is used consistently herein with its common definition of an appliance or device.

The term "route" is used to refer to a fully or partially expanded prefix (e.g., 10.0.0.1 or 10.0.*.*), which is different than a "path" through the network which refers to a nexthop (e.g., next router) or complete path (e.g., traverse router A then router B, and so on). Also, the use of the term "prefix" without a qualifier herein refers to a fully or partially expanded prefix. As used herein, "forwarding information" includes, but is not limited to, information describing how to process (e.g., forward, send, manipulate, modify, change, drop, copy, duplicate, receive) corresponding packets. In one embodiment, determining forwarding information is performed via an ingress lookup operation and an egress lookup operation.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc., as well as "particular" and "specific" are typically used herein to denote different units (e.g., a first widget or operation, a second widget or operation, a particular widget or operation, a specific widget or operation). The use of these terms herein does not necessarily connote an ordering such as one unit, operation or event occurring or coming before another or another characterization, but rather provides a mechanism to distinguish between elements units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC § 101 machine statutory class.

Figure 1A:
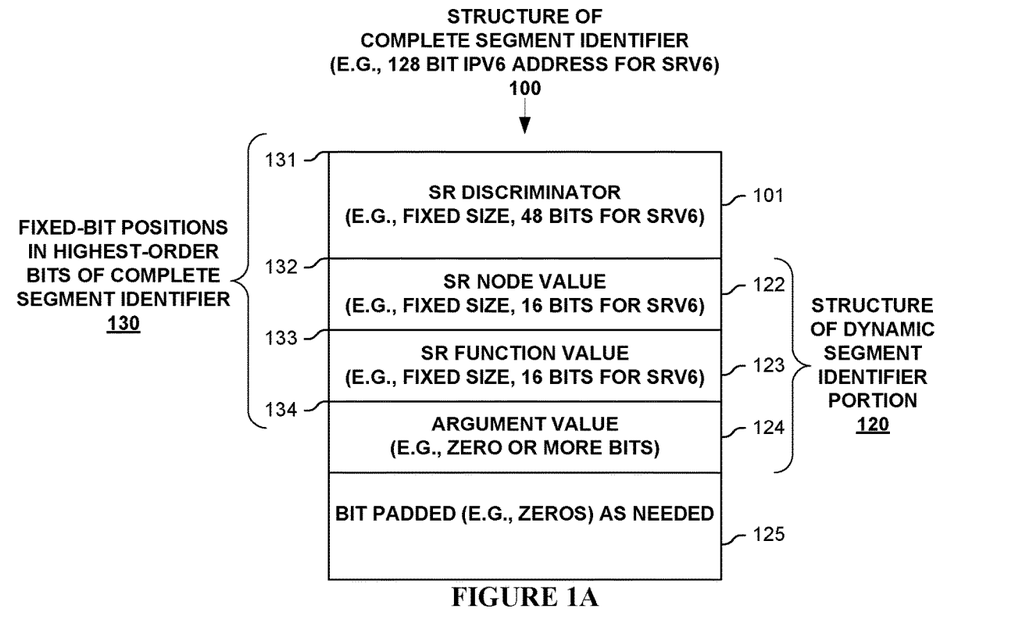
FIG. 1A illustrates a complete segment identifier structure according to one embodiment.

FIG. 1A illustrates a complete segment identifier structure 100 according to one embodiment. As shown, complete segment identifier 100 includes a segment routing discriminator 101, structure of a dynamic segment identifier portion 120, and bit padding 125 as needed. Using a known bit padding value 125 (e.g., all zeros or all ones for simplicity) allows for exact matching of a complete segment identifier 100. Dynamic segment identifier portion 120 includes SR node value 122, SR function value 123, and argument value 124 (if used). In one embodiment, each of SR discriminator 101, SR node value 122, and SR function value 123 is a fixed size and located in a corresponding fixed position 130 (i.e., 131-134) in the highest-order bits of compete segment identifier segment 100. Thus, the structure of complete segment identifier 100 allows a SR node to efficiently extract any of the desired fields 101-124. This includes a SR node (corresponding to SR node value 122) performing the segment routing processing (corresponding to SR function value 123) which includes accessing argument value 124 (qualify this segment routing processing) at the fixed position 134 within complete segment routing identifier 100, rather than acquiring such as via an additional read or parsing operation if argument value 124 was located elsewhere (e.g., at the end of complete segment identifier 100).

In one embodiment, complete segment identifier 100 is an IPv6 128-bit address, with a sixty-four bit SR discriminator 101, a sixteen-bit SR node value 122, a sixteen-bit SR function value 123, and an argument value 124 of zero or more bits qualifying the processing identified by SR function value 123.

Figure 1B:
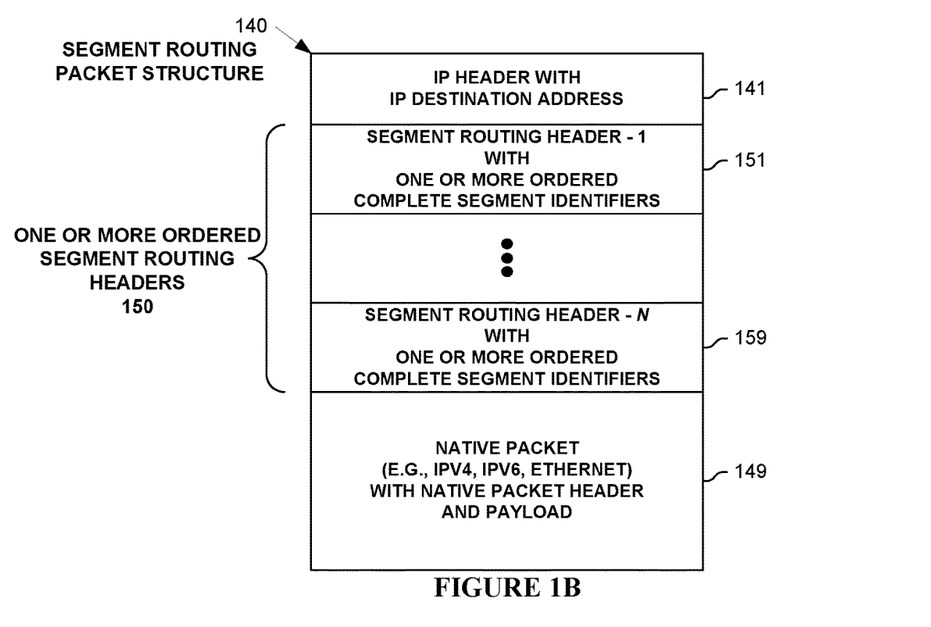
FIG. 1B illustrates a segment routing (SR) packet structure according to one embodiment.

FIG. 1B illustrates a segment routing packet structure 140 according to one embodiment. As shown, SR packet structure 140 includes an IP header 141 (e.g., IPv6, IPv4) including an IP destination address (which typically is a complete segment identifier), multiple ordered segment routing headers 150, and the native (encapsulated) packet 149. Each of multiple ordered SR headers 150 (which includes SR headers 151-159) typically includes one or more complete segment identifiers. By allowing multiple, typically smaller SR headers, SR packet format 140 provides processing and/or memory efficiencies especially for limited-capability (e.g., less memory, less processing power) SR routers. In one embodiment, a SR packet with only a single complete segment identifier has no segment routing header 150.

As shown, multiple ordered SR headers 150 includes one to n SR headers 151-159, with n being a positive integer. Each of these ordered SR headers 151-159 includes an ordered list of one or more complete segment identifiers (e.g., IPv6 or IPv4 address), each representing a segment in the SR network used to process (e.g., forward, manipulate, modify) a SR packet in and through the SR network.

Figure 2A:
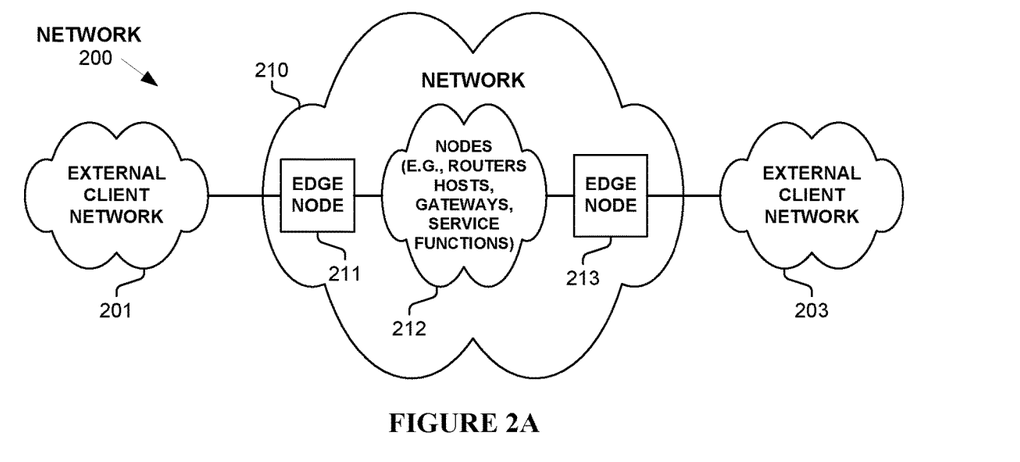
FIG. 2A illustrates a network operating according to one embodiment.

FIG. 2A illustrates network 200 operating according to one embodiment. As shown, network 200 includes client networks 201 and 203 (which are the same network in one embodiment) external to segment routing (SR) network 210, which includes SR edge nodes 211 and 213 and a network 212 of network nodes including SR-capable routers (and possibly some that are not SR-capable in that they do not process a segment routing header/complete segment identifier), SR gateways, and service functions. In one embodiment, SR edge nodes 211 and 213 typically encapsulate native packets received from networks 201 and 203 into SR packets according to a data plane ascertained SR policy, and subsequently decapsulate native packets from SR packets and forward the native packets into network 201 and 203.

In response to receiving a packet, a SR edge node 211, 213 and/or a SR node within network 212 determines a SR policy (e.g., list of complete segment identifiers) through and/or to which to forward a SR packet encapsulating the native packet. These policies can change in response to network conditions, network programming, etc. In one embodiment, the SR policy specifies to add one or more SR headers, each with one or more complete segment identifiers, resulting in a SR packet having one or more SR headers. In one embodiment, a native packet is received without a SR header, and the SR node encapsulates the native packet in a SR packet including one or more added SR headers, each including one or more complete segment identifiers. In one embodiment, a SR packet is received with a SR header, and with SR node adding one or more SR headers resulting in a SR packet including one or more added SR headers, each including one or more complete segment identifiers. In contrast, and for each of these scenarios a single SR header could have been used that includes all of the complete segment identifiers.

Figure 2B:
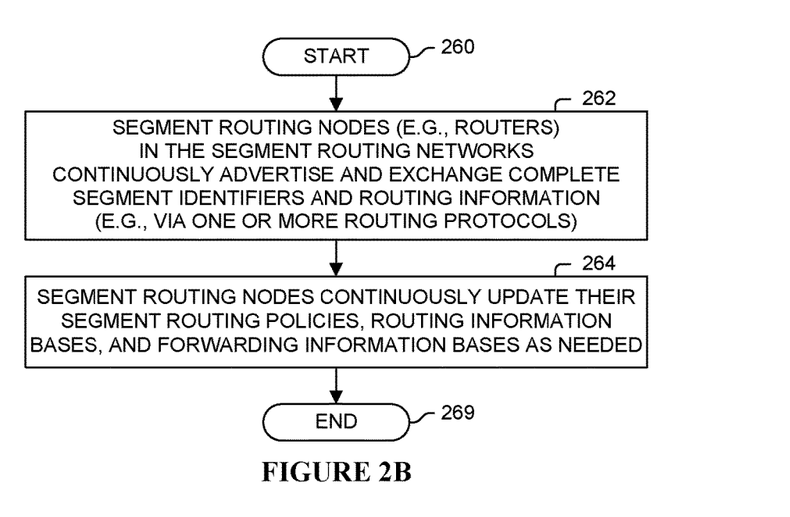
FIG. 2B illustrates a process according to one embodiment.

FIG. 2B illustrates a process according to one embodiment associated with distributing segment routing information including complete segment identifiers in a network. Processing begins with process block 260. In process block 262, SR routers in the SR networks continuously advertise and exchange segment routing information (e.g., including advertising routes of complete segment identifiers) and other routing information (e.g., IPv4 or IPv6 topology information) via one or more routing protocols and/or via one or more label distribution protocols. As used herein, advertising of a route of a complete segment identifier includes advertising the fully expanded route, or a prefix corresponding to the complete segment identifier (e.g., the SR discriminator and SR node value, and possibly the SR function with or without an argument).

In one embodiment, one or more SR routers advertise a predetermined maximum or preferred number (e.g., for increased or maximum efficiency) of complete segment identifiers to include in a SR header that will be processed by the corresponding SR node. In one embodiment, such advertising identifies those SR nodes that gain processing and/or memory efficiencies when a SR header has only a small number of complete segment identifiers. In one embodiment, a value (e.g., number, flag, range) corresponding to a predetermined quantity is advertised.

In process block 264, SR (and other) network nodes continuously update their SR policies and/or routing information as required (e.g., based on information received via a routing protocol, from a network management system, etc.). Processing of the flow diagram of FIG. 2B is complete as indicated by process block 269.

Figure 3A:
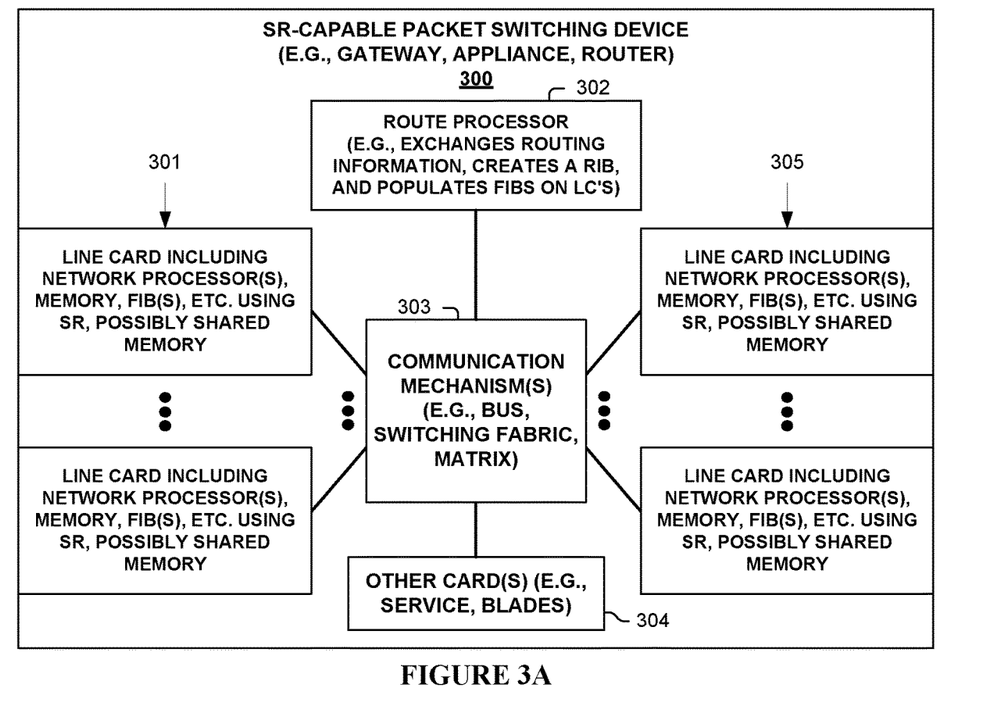
FIG. 3A illustrates a packet switching device according to one embodiment.
Figure 3B:
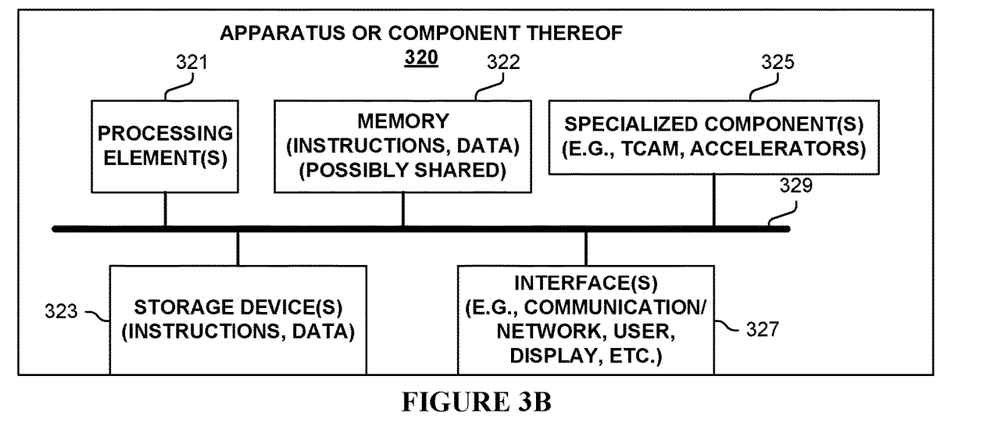
FIG. 3B illustrates an apparatus according to one embodiment.

FIGS. 3A-B and their discussion herein provide a description of various SR network nodes according to one embodiment.

FIG. 3A illustrates one embodiment of a SR-capable packet switching device 300 (e.g., SR gateway, appliance, router, packet switching device, possibly with one or more service functions) according to one embodiment. As shown, packet switching device 300 includes multiple line cards 301 and 305, each with one or more network interfaces for sending and receiving packets over communications links (e.g., possibly part of a link aggregation group), and with one or more processing elements that are used in one embodiment associated with segment routing (SR) network processing of packets including packets having a segment identifier structure providing processing and/or memory efficiencies. Packet switching device 300 also has a control plane with one or more processing elements 302 for managing the control plane and/or control plane processing of packets associated with segment routing (SR) network processing of packets including packets having a segment identifier structure providing processing and/or memory efficiencies. Packet switching device 300 also includes other cards 304 (e.g., service cards, blades) which include processing elements that are used in one embodiment to process (e.g., forward/send, drop, manipulate, change, modify, receive, create, duplicate, perform SR gateway functionality possibly with shared memory with one or more service functions, apply a service according to one or more service functions) packets associated with segment routing (SR) network processing of packets including packets having a segment identifier structure providing processing and/or memory efficiencies, and some hardware-based communication mechanism 303 (e.g., bus, switching fabric, and/or matrix, etc.) for allowing its different entities 301, 302, 304 and 305 to communicate. Line cards 301 and 305 typically perform the actions of being both an ingress and egress line card, in regards to multiple other particular packets and/or packet streams being received by, or sent from, packet switching device 300. In one embodiment, a SR gateway and service functions are implemented on a line card 301, 305.

FIG. 3B is a block diagram of an apparatus 320 used in one embodiment associated with segment routing (SR) network processing of packets including packets having a segment identifier structure providing processing and/or memory efficiencies. In one embodiment, apparatus 320 performs one or more processes, or portions thereof, corresponding to one of the flow diagrams illustrated or otherwise described herein, and/or illustrated in another diagram or otherwise described herein.

In one embodiment, apparatus 320 includes one or more processor(s) 321 (typically with on-chip memory), memory 322 (possibly shared memory), storage device(s) 323, specialized component(s) 325 (e.g. optimized hardware such as for performing lookup and/or packet processing operations and/or service function, associative memory, binary and/or ternary content-addressable memory, etc.), and interface(s) 327 for communicating information (e.g., sending and receiving packets, user-interfaces, displaying information, etc.), which are typically communicatively coupled via one or more communications mechanisms 329 (e.g., bus, links, switching fabric, matrix), with the communications paths typically tailored to meet the needs of a particular application.

Various embodiments of apparatus 320 may include more or fewer elements. The operation of apparatus 320 is typically controlled by processor(s) 321 using memory 322 and storage device(s) 323 to perform one or more tasks or processes. Memory 322 is one type of computer-readable/computer-storage medium, and typically comprises random access memory (RAM), read only memory (ROM), flash memory, integrated circuits, and/or other memory components. Memory 322 typically stores computer-executable instructions to be executed by processor(s) 321 and/or data which is manipulated by processor(s) 321 for implementing functionality in accordance with an embodiment. Storage device(s) 323 are another type of computer-readable medium, and typically comprise solid state storage media, disk drives, diskettes, networked services, tape drives, and other storage devices. Storage device(s) 323 typically store computer-executable instructions to be executed by processor(s) 321 and/or data which is manipulated by processor(s) 321 for implementing functionality in accordance with an embodiment.

Figure 3C:
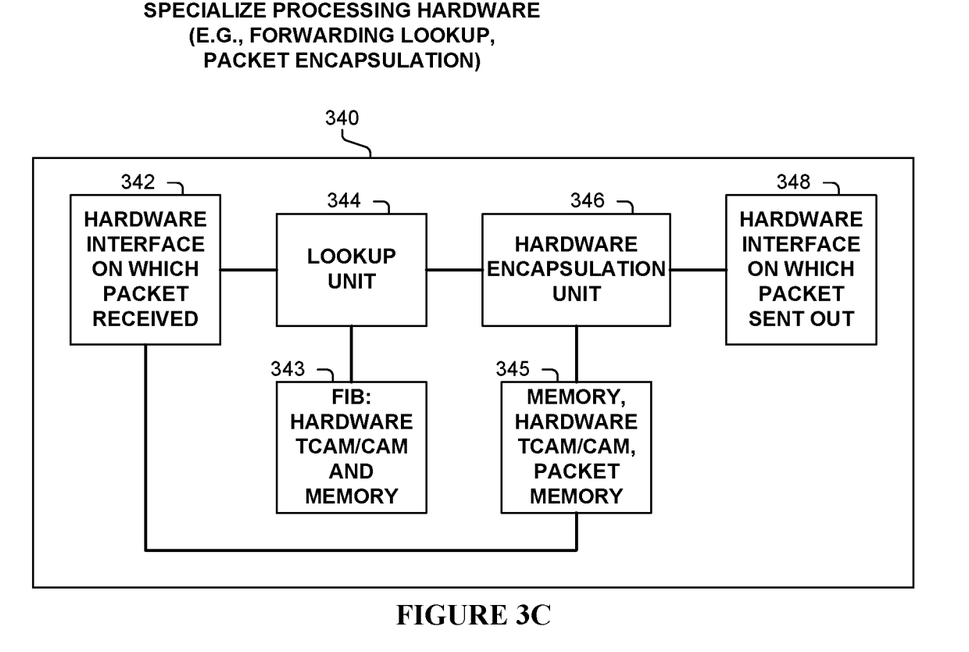
FIG. 3C illustrates a specialized ingress processing hardware according to one embodiment.

FIG. 3C illustrates specialized processing hardware 340 according to one embodiment. As shown, hardware interface 342 receives packets which are stored in packet memory 345 (at least the packet payload), with lookup information (e.g., packet headers) being provided to lookup unit 344. For each packet, lookup unit 344, referencing a forwarding information base 343, determines forwarding information which is provided to hardware encapsulation unit 346. In one embodiment, FIB 343 uses specialized hardware and/or data structures 343 (e.g., hardware binary and/or ternary content-addressable memory, data structures in memory). In one embodiment, hardware encapsulation unit 346 is specialized hardware that efficiently encapsulates a native packet into a segment routing packet (which includes adding one or more complete segment identifiers) and provides the segment routing packet to hardware interface 348 on which the packet is sent into the network according to forwarding information (e.g., identification of hardware interface 348 as the outbound interface, nexthop information). In one embodiment, hardware encapsulation unit uses hardware and/or data structures 345 (e.g., hardware binary and/or ternary content-addressable memory, data structures in memory, packet memory) in generating the segment routing packet encapsulating the received native packet.

Figure 4:
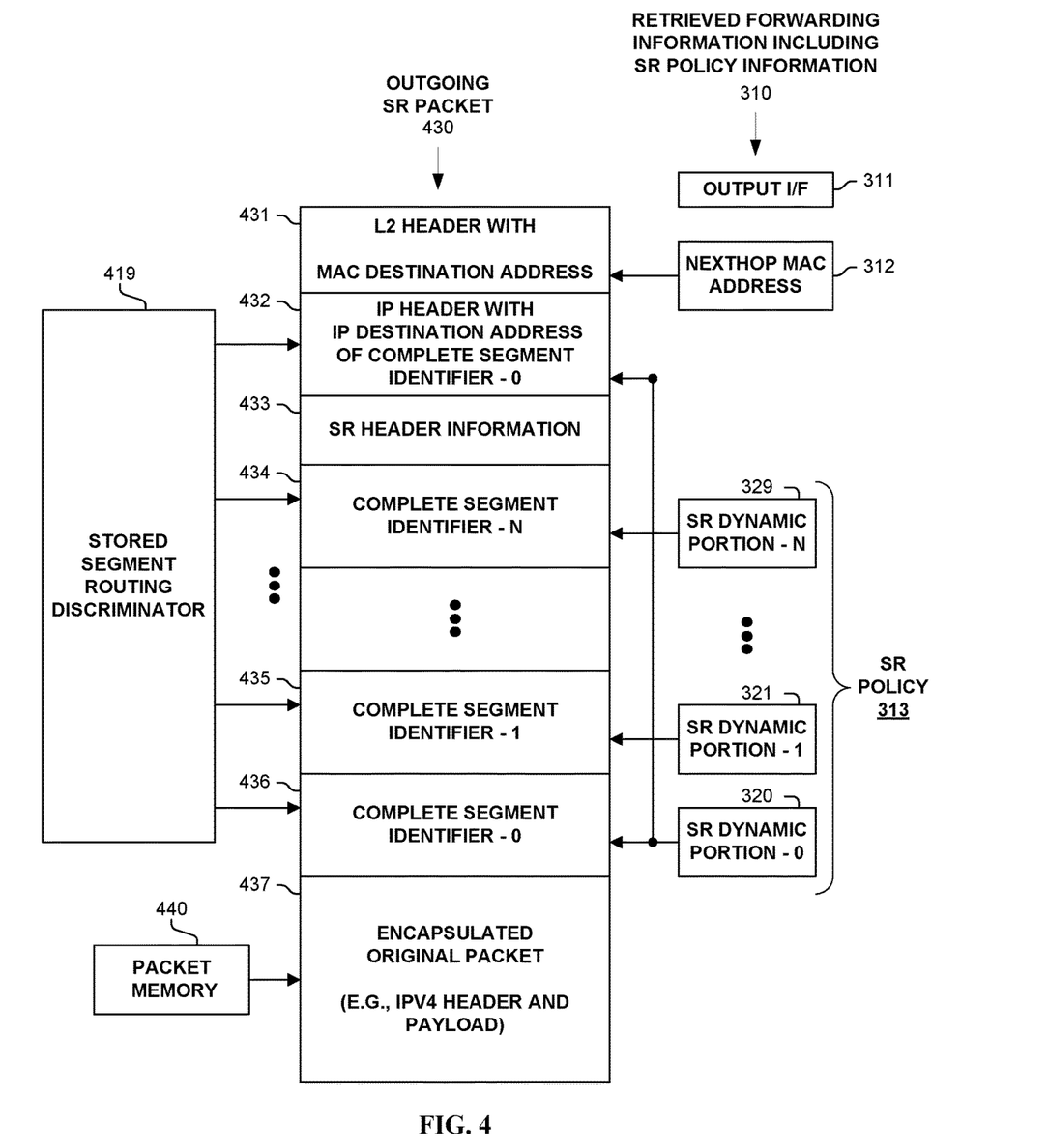
FIG. 4 illustrates resource and memory efficient processing to add one or more complete segment identifiers to a packet according to one embodiment.

FIG. 4 illustrates resource and memory efficient processing to add one or more complete segment identifiers to a packet according to one embodiment, such as, but not limited to, by an apparatus illustrated and/or described in relation to FIG. 3A, 3B, and/or 3C. In one embodiment, this processing is performed by hardware encapsulation unit 346 of FIG. 3C.

As shown, a lookup operation in a forwarding information base (e.g., based on a destination address of a received packet) retrieves forwarding information 310. In one embodiment, forwarding information 310 includes the identification of an output interface 311, a nexthop MAC address 312, and a SR policy 313 including n (i.e., one or more) dynamic segment routing identifier portions 320-329 (each including a SR node value and SR function value, and possibly an argument value). Outgoing SR packet 430 is populated with nexthop MAC address 312 in L2 header 431, the encapsulated original packet from packet memory 440, SR header information 433, as well as other information (e.g., in L2 header 431, in IP header 432).

Additionally and as shown, outgoing SR packet 430 is efficiently created, which includes generating n+1 complete segment identifiers 434-436 from (a) segment routing discriminator 419 plus (b) each of the n dynamic segment routing identifier portions 320-329, as IP header 432 includes as its destination address complete segment identifier-0 (436) (hence, n+1 complete segment identifiers 434-436 are generated).

In one embodiment, outgoing SR packet 430 is efficiently created, which includes by generating n complete segment identifiers 434-436 from (a) segment routing discriminator 419 plus (b) each of the n dynamic segment routing identifier portions 320-329 as SR identifier 436 is not included in the SR header, but only as the IP destination address in IP header 432 (hence, n complete segment identifiers 434-436 are generated).

In one embodiment, each of complete segment identifiers 434-436 (including in IP header 432) is set to all zeros prior to generating complete segment identifiers 434-436 for ease of bit-padding. In one embodiment, any bit-padding value is used. By using a known bit-padding pattern (e.g., all zeros), exact matching can be used on a complete segment identifier (e.g., rather than a more resource-intensive longest prefix matching operation). In one embodiment, segment routing discriminator 419 is stored in global memory or a register. In one embodiment, segment routing discriminator 419 is the same for all complete segment identifiers 434-436. In one embodiment, each segment routing discriminator 419 is one of a small number of segment routing discriminators identified by a corresponding SR dynamic portion 320-329, thus they can vary among complete segment routing identifiers 434-436. Further, one embodiment includes more than one SR header, each including at least one complete segment identifier 434-436.

Figure 5:
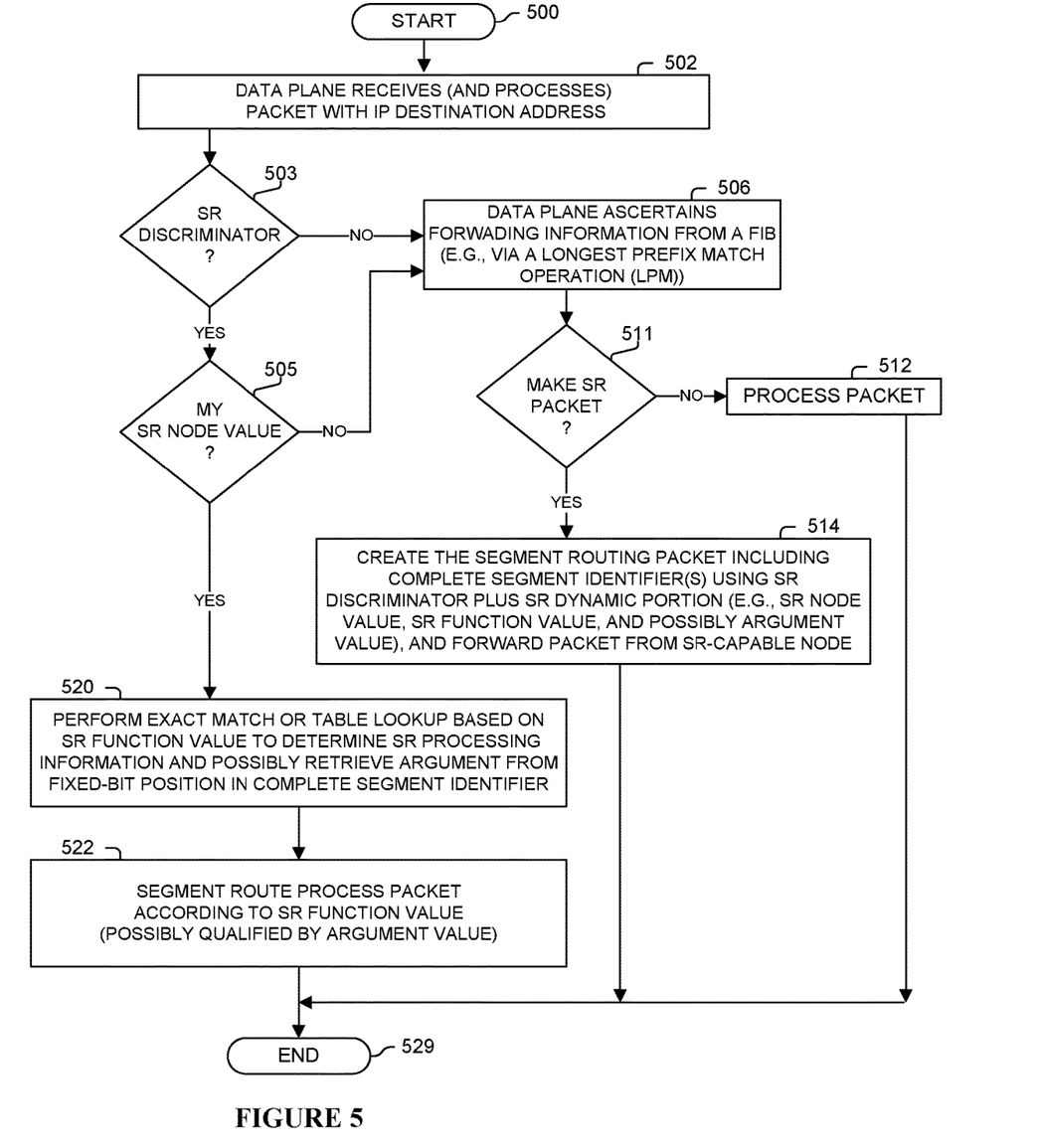
FIG. 5 illustrates a process according to one embodiment.

FIG. 5 illustrates a process performed by a SR-capable network node (e.g., router) according to one embodiment. Processing begins with process block 500. In process block 502, the data plane of the SR-capable network node receives a packet with an IP destination address. As determined in process block 503, if a corresponding portion of the IP destination address has the value of a SR discriminator (i.e., the destination address is a complete segment identifier possibly to be SR processed by the network node), then processing proceeds to process block 505; else processing proceeds to process block 506. Continuing and as determined in process block 505, a corresponding portion of the IP destination address has the value of a SR node value of the network node (i.e., the destination address is a complete segment identifier to be SR processed by the network node), then processing proceeds to process block 520; else processing proceeds to process block 506.

Continuing in process block 506, the IP destination address ascertains forwarding information from a forwarding information base (FIB), typically via a longest prefix matching operation. As determined in process block 511, if the forwarding information indicates to create a segment routing packet encapsulating the received packet, then processing proceeds to process block 514; else the packet is processed normally in process block 512, and processing continues to process block 529. Continuing and in process block 514, a segment routing packet is created that includes one or more complete segment identifier(s) containing a SR discriminator plus SR dynamic portion (e.g., SR node value, SR function value, and possibly argument value), and with the segment routing packet being forwarded from the SR-capable network node; and processing continues to process block 529.

Continuing and in process block 520 (e.g., after determining the packet received was a SR packet to be segment routing processed by the network node), an exact match or table lookup operation is performed based on the SR function to determine SR processing information, and possibly to retrieve an argument value from fixed-bit position in complete segment identifier (which is the IP destination address). In process block 522, the packet is segment route processed according to the determined SR processing information, possibly qualified by argument value. The SR processing may include updating a segment routing header, performing one or more segment routing functions, updating one or more IP and/or MAC addresses, decapsulating a native packet, forwarding a packet from the SR-capable node, etc. Processing proceeds to process block 529.

As indicated by process block 529, processing of the flow diagram of FIG. 5 is complete.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:
  forming a particular segment routing (SR) packet by a particular router in a network, with said forming including generating one or more complete segment identifiers, with each of said one or more complete segment identifiers being an Internet Protocol (IP) address; and sending from the particular router into the network, the particular SR packet including said one or more complete segment identifiers;

wherein said generating each particular complete segment identifier of said one or more complete segment identifiers includes independently retrieving from non-consecutive memory locations and combining a corresponding segment routing discriminator with a corresponding dynamic segment routing identifier portion; and wherein the corresponding dynamic segment routing identifier portion includes a SR node value and a SR function value, with the SR node value stored in higher-order bits than the SR function value in said retrieved corresponding dynamic segment routing identifier portion, and with the SR function value identifying corresponding segment routing processing to be performed by a corresponding router identified based on the SR node value.

2. The method of claim 1, wherein each of said one or more complete segment identifiers is a 128-bit Internet Protocol version 6 (IPv6) address.

3. The method of claim 2, wherein the highest-order bits of a segment identifier of said one or more complete segment identifiers consists of three predetermined fixed-width fields for the corresponding segment routing discriminator, the SR node value and the SR function value.

4. The method of claim 3, wherein the segment identifier includes the corresponding segment routing discriminator having forty-eight bits or sixty-four bits, the SR Node value having sixteen bits, and the SR function having sixteen bits; and wherein the corresponding segment routing discriminator of the segment identifier is a fixed value of between one and eight possible values; wherein the dynamic segment routing identifier portion of the segment identifier further includes between one and three bits that identifies which of said eight possible values is the corresponding segment routing discriminator of the segment identifier.

5. The method of claim 3, wherein the dynamic segment routing identifier portion of the segment identifier includes an argument value qualifying processing according to the SR function value, with the highest-order bit of the argument value being included at a predetermined fixed-bit position immediately following the SR function value in the highest-order bits of the segment identifier.

6. The method of claim 2, wherein the particular SR packet said sent from the particular router includes an IPv6 header that comprises a particular complete segment identifier of said one or more complete segment identifiers as a destination address of the IPv6 header.

7. The method of claim 6, comprising:
advertising, via a routing protocol in the network, a route corresponding to the particular complete segment identifier such that packets in the network matching the route are forwarded through the network to a particular corresponding router;
updating with the route and forwarding information a routing information base (RIB) and a data plane forwarding information base (FIB) in the particular router and in another router in network;
receiving, by the particular corresponding router, the particular SR packet with the particular complete segment identifier as the destination address; and
particular segment routing processing, by the particular corresponding router, of the particular SR packet based on the SR function value in the particular complete segment identifier;
wherein the particular SR packet is said sent from the particular router based on said forwarding information corresponding to the route in the FIB in the particular router.

8. The method of claim 7, wherein the dynamic segment routing identifier portion of the segment identifier includes an argument value qualifying processing according to the SR function value, with the highest-order bit of the argument value being included at a predetermined fixed-bit position immediately following the SR function value in the highest-order bits of the segment identifier; and wherein said particular segment routing processing is responsive to the argument value in the particular complete segment identifier at the predetermined fixed-bit argument position.

9. The method of claim 2, wherein at least one of said one or more complete segment identifiers is included in a Segment Routing version 6 (SRv6) Header (SRH) in the particular SR packet said sent into the network.

10. The method of claim 1, comprising:
advertising, via a routing protocol in the network, a particular route corresponding to a particular segment identifier of said one or more complete segment identifiers such that packets in the network matching the particular route are forwarded through the network to a particular corresponding router;
updating with the particular route and forwarding information a routing information base (RIB) and a data plane forwarding information base (FIB) in the particular router and in another router in network;
receiving, by the particular corresponding router, the particular SR packet having an IP destination address of the particular complete segment identifier; and
particular segment routing processing, by the particular corresponding router, of the particular SR packet based on the SR function value in the particular segment identifier;
wherein the particular SR packet is said sent from the particular router based on said forwarding information corresponding to the particular route in the FIB in the particular router.

11. The method of claim 1, wherein each of the corresponding segment routing discriminator, the SR node value, and the SR function value is stored in a segment identifier of said one or more complete segment identifiers at a corresponding fixed-bit position; and wherein the method includes:
receiving, by the corresponding router, the particular SR packet; and
particular segment routing processing, by the corresponding router, of the particular SR packet based on the SR function value retrieved from the segment identifier at said corresponding fixed-bit position.

12. The method of claim 11, wherein the dynamic segment routing identifier portion of the segment identifier includes an argument value qualifying processing according to the SR function value, with the highest-order bit of the argument value being included at a predetermined fixed-bit position immediately following the SR function value in the highest-order bits of the segment identifier.

13. The method of claim 1, wherein at least of said one or more complete segment identifiers is a 128-bit Internet Protocol version 6 (IPv6) address with the highest-order bits consisting of three predetermined fixed-width fields storing the corresponding segment routing discriminator, the SR node value, and the SR function value.

14. An apparatus, comprising:
one or more hardware interfaces sending and receiving packets; and
one or more network processors with memory associated therewith;
wherein the apparatus, communicatively coupled in a network, performs packet processing operations including segment routing-capable (SR-capable) packet processing operations, with said packet processing operations including:
forming a particular segment routing (SR) packet, with said forming including generating one or more complete segment identifiers, with each of said one or more complete segment identifiers being an Internet Protocol (IP) address; and
sending into the network, the particular SR packet including said one or more complete segment identifiers;
wherein said generating each particular complete segment identifier of said one or more complete segment identifiers includes independently retrieving from non-consecutive memory locations and combining a corresponding segment routing discriminator with a corresponding dynamic segment routing identifier portion; and wherein the corresponding dynamic segment routing identifier portion includes a SR node value and a SR function value, with the SR node value stored in higher-order bits than the SR function value in said retrieved corresponding dynamic segment routing identifier portion, and with the SR function value identifying corresponding segment routing processing to be performed by a corresponding router identified based on the SR node value.

15. The apparatus of claim 14, wherein a segment identifier of said one or more complete segment identifiers is a 128-bit Internet Protocol version 6 (IPv6) address with the highest-order bits consisting of three predetermined fixed-width fields storing the corresponding segment routing discriminator, the SR node value, and the SR function value.

16. The apparatus of claim 14, wherein each of said one or more complete segment identifiers is a 128-bit Internet Protocol version 6 (IPv6) address.

17. The apparatus of claim 16, wherein the highest-order bits of a segment identifier of said one or more complete segment identifiers consists of three predetermined fixed-width fields for the corresponding segment routing discriminator, the SR node value and the SR function value.

18. The apparatus of claim 17, wherein the dynamic segment routing identifier portion of the segment identifier includes an argument value qualifying processing according to the SR function value, with the highest-order bit of the argument value being included at a predetermined fixed-bit position immediately following the SR function value in the highest-order bits of the segment identifier.

19. The apparatus of claim 16, wherein the particular SR packet includes an IPv6 header that comprises a particular complete segment identifier of said one or more complete segment identifiers as a destination address of the IPv6 header.

20. The apparatus of claim 16, wherein at least one of said one or more complete segment identifiers is included in a Segment Routing version 6 (SRv6) Header (SRH) in the particular SR packet said sent into the network.

* * * * *